Patented July 26, 1932

1,868,704

REISSUED
UNITED STATES PATENT OFFICE

WILLIAM J. HALE, OF MIDLAND, MICHIGAN, AND WILLIAM S. HALDEMAN, OF MONMOUTH, ILLINOIS

METHOD OF CONTROLLING THE ACCUMULATION OF ALDEHYDES IN THE FORMATION OF ORGANIC ACIDS FROM PRIMARY ALCOHOLS

No Drawing.     Application filed June 9, 1928.  Serial No. 284,271.

This invention relates to methods of producing aliphatic acids from the corresponding alcohols by successive dehydrogenation and oxidation.

It has heretofore been proposed to accomplish such dehydrogenation and oxidation whereby the original primary alcohol is first dehydrogenated to form the corresponding aldehyde and hydrogen, and then this mixed vapor is oxidized by suitable means to produce acetic acid and water vapor, respectively.

It has likewise been found that mixed aliphatic acid vapor and hydrogen, in the presence of metallic surfaces at temperatures of around 300° C., establish equilibrium with respect to the corresponding aldehyde and water (see German Patent 185,932), as shown by the following equation:

$$CH_3CHO + H_2O = CH_3COOH + H_2$$

In the state of equilibrium existent in the coupled reaction aforementioned, it has now been discovered that the absence of hydrogen at the end of the process leads to a partial decomposition of the organic compounds present, resulting in the formation of the hydrogen necessary for maintaining the equilibrium already described; the concomitantly formed carbon dioxide representing a loss in total acid produced. Also, the consequent production of aldehyde at the expense of the acid will proceed in definite ratio from the standpoint of the acid and hydrogen on the one hand, and aldehyde and water on the other, and such ratio will be identical with that found in the effluent vapors issuing from the reaction vessel.

Any decomposition of the organic material to provide hydrogen is avoided according to the present invention, by maintaining hydrogen continuously present so long as the vapors are in contact with masses capable of catalytic action upon the organic substances present, as by carrying a certain portion of the hydrogen resulting from the first step of dehydrogenation of alcohol rapidly over into the zone in which the aldehyde itself is undergoing oxidation, and possibly by adding further hydrogen in this oxidation zone.

Further, according to the present process, a course of reaction may be established by which alcohol is brought into the system and successively subjected to dehydrogenation and oxidation to form the corresponding acid, which is removed by a dephlegmation at the end of the system; and the aldehyde fraction, existent in equilibrium with the acid, is removed at this stage, preferably in vapor form, and is returned to the beginning of the system for re-introduction along with fresh quantities of alcohol. According to this process, therefore, a quantity of acid is finally formed which corresponds almost theoretically with the total quantity capable of production.

In practice, it has been found that as much as one-third of the total final product is represented by the aldehyde, and in order therefore to eliminate the continuous production of such aldehyde at the expense of the corresponding acid here concerned, we have discovered that it is only necessary to maintain the same concentration of aldehyde in the entire system as has been indicated in the effluent product itself. For practical purposes, the introduction of such aldehyde may be made at any point prior to the aldehyde oxidation, preferably in the alcohol vapor itself. As a result, our discovery offers a means of maintaining in the total vapors, the maximum aldehyde concentration possible according to the equilibrium which definitely establishes this ratio.

Aldehyde or the uncondensed aldehydic fraction of the effluent product is introduced into the alcohol vapors in the proportion of about one-half of the weight of the alcohol vapors, that is, the incoming vapors in the system comprise approximately two parts of the alcohol and one part of the corresponding aldehyde by weight. In operation with this mixture, an ideal result is obtained, namely, a complete oxidation of the alcohol portion of the original vapors to the acid, and a carrying through of a proportion of aldehyde—being that defined by the ratio of aldehyde to acid at equilibrium at the end of the reaction zone and encountered in the final reaction product—so that this same quantity of aldehyde in turn may be admixed with the same amount of fresh alcohol, and thus continuously serve in the accomplishment of the end sought.

The temperature of the reaction is maintained as low as possible; and under certain circumstances has already been made lower than 300° C. The materials which are capable of employment for this reaction must be such that in the form and condition in which present in the apparatus they are capable, on the one hand, of changing the aldehyde to acid, and on the other hand, they must be likewise capable of acting as a catalyst for the dehydrogenation, at the temperature of reaction, for removing hydrogen from the alcohol introduced. Such, for example, are the metals, copper, silver, gold and mercury, when employed in the system in various stages of oxidation and reduction.

Example

A test tower is filled initially with a mass comprising cuprous oxide with approximately one percent of silver, and is maintained at about 350° at the top and 280° C. at the bottom. A commercial alcohol of 80% strength in amount representing 92 grams of ethyl alcohol, is mixed with acetaldehyde in a proportion of the latter of about 45 grams, the mixture is evaporated and the mixed alcohol and aldehyde vapors are then passed through the tower from bottom to top. Other gases which are inert under the conditions and at the temperatures of the reaction, such as nitrogen and water vapor, may be introduced; the latter, for example, serving to control the reaction and prevent excessive oxidation, and to prevent the formation of such by-products as ether compounds (acetals), etc. The entering vapors come into contact with the reactive mass which acts catalytically upon them to abstract hydrogen from each molecule of entering alcohol, with a conversion of the same to the corresponding aldehyde and hydrogen, which continue to ascend in the tower. Almost immediately following the step of dehydrogenation, the aldehyde vapor is oxidized to the corresponding acid, and owing to the presence of water vapor, the metallic oxide in the reactive mass will be converted into acetate, which particularly facilitates the subsequent oxidation. Owing to the temperature of the reaction, the major quantity of the acid is maintained in vapor form, and passes upwardly in the tower with the water vapor.

The flow through the tower is maintained so rapid that hydrogen remains present in the vapors so long as the latter are in contact with the reactive mass. The presence of a very small quantity of hydrogen in the effluent vapors will indicate this.

The effluent products are subjected to dephlegmation, with an overall yield representing 95% of the theoretical in glacial acetic acid: together with approximately 45 grams of acetaldehyde which may be returned for mixing with a further quantity of fresh alcohol, being preferably in the form of a vaporous aldehyde fraction. With a cyclic operation employing a uniform admission of alcohol, the quantity of aldehyde resulting from the purification of the acetic acid is substantially that required for mixing with the alcohol vapors to produce the desired proportion, this aldehyde fraction remaining in the vapor form, and hence without loss of the heat values therein.

It has been found that this reaction may be accomplished at temperatures between 150 and 350° C. in practice, and with an excellently adapted temperature of between 220 and 280° C.

Although the invention has been described specifically in the catalytic production of acetic acid from ethyl alcohol, by the production and immediate oxidation of acetaldehyde, it will be understood that the invention is not limited to the particular form set forth in the foregoing example; but may be practiced in other ways and with other reaction materials, and for the formation of formic, propionic, butyric, etc. acids.

We claim:

1. In a reaction involving the dehydrogenation of a primary alcohol and oxidation of the resultant aldehyde and hydrogen into the corresponding acid and water respectively, the method which comprises the introduction into the original alcoholic mixture of approximately that same proportional quantity of aldehyde as is found associated with the acid in the final reaction product, and thus serving to replace the aldehyde necessary of formation in the equilibrium existent in the process, and the carrying over of hydrogen from the dehydrogenation zone into the oxidation zone to such an extent as to prevent the decomposition of organic materials present to form hydrogen to satisfy such equilibrium.

2. In the production of an organic acid from the corresponding alcohol by dehydrogenation and oxidation, the step which comprises mixing with the original alcohol a quantity of a material containing the corresponding aldehyde substantially equal to the proportion thereof existing in equilibrium with the produced acid in the final product.

3. The method of converting a lower primary aliphatic alcohol to the corresponding acid, which comprises preparing a mixture of alcohol and water vapors, introducing the vapor of the corresponding aldehyde into the said vapors, bringing the mingled vapors into contact with a catalyst operating to dehydrogenate the alcohol and with an oxidizing agent operating to oxidize the aldehyde to the acid, while maintaining the temperature between 150 and 350 degrees C., the contact with said oxidizing agent being kept insufficient to oxidize all of the hydrogen present, condensing the acid from the effluent vapors and returning the aldehyde in the effluent vapors for mingling with further mixed alcohol and water vapors.

4. The method of converting a lower primary aliphatic alcohol in the corresponding acid, which comprises preparing a mixture of alcohol and water vapors, introducing the vapor of the corresponding aldehyde into the said vapors, bringing the mingled vapors at a uniform rate of flow into contact with a catalyst operating to dehydrogenate the alcohol and with an oxidizing agent operating to oxidize the aldehyde to the acid, while maintaining the temperature between 150 and 350 degrees C., the contact with said oxidizing agent being kept insufficient to oxidize all of the hydrogen present, condensing the acid from the effluent vapors, and returning the aldehyde in the effluent vapors for mingling with further mixed alcohol and water vapors.

5. The method of converting ethyl alcohol to acetic acid, which comprises preparing a mixture of ethyl alcohol and water vapors, introducing acetaldehyde vapor into the said vapors, bringing the mingled vapors into contact with a catalytically acting mass of copper oxides while maintaining the temperature of the said mass between 150 and 350 degrees C., and while maintaining the rate of flow so rapid that a portion of the hydrogen is carried through the mass into the effluent vapors without oxidation, condensing the acetic acid from the effluent vapors, and returning the acetaldehyde of the vapors for mingling with further ethyl alcohol and water vapors.

In testimony whereof, we affix our signatures.

WILLIAM J. HALE.
WILLIAM S. HALDEMAN.